United States Patent
Fukuzumi

(10) Patent No.: US 6,705,275 B2
(45) Date of Patent: Mar. 16, 2004

(54) INCYLINDER DIRECT INJECTION SPARK IGNITION ENGINE

(75) Inventor: Masahiro Fukuzumi, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 75 days.

(21) Appl. No.: 10/169,940

(22) PCT Filed: Nov. 30, 2001

(86) PCT No.: PCT/JP01/10475
§ 371 (c)(1),
(2), (4) Date: Jul. 11, 2002

(87) PCT Pub. No.: WO02/055849
PCT Pub. Date: Jul. 18, 2002

(65) Prior Publication Data
US 2003/0010313 A1 Jan. 16, 2003

(30) Foreign Application Priority Data
Jan. 5, 2001 (JP) .......................... 2001-000367

(51) Int. Cl.[7] .................... F02B 31/08; F02B 23/10
(52) U.S. Cl. .................. 123/295; 123/301; 123/302; 123/305
(58) Field of Search ................ 123/295, 301, 123/302, 305

(56) References Cited

U.S. PATENT DOCUMENTS

| | | | |
|---|---|---|---|
| 5,908,018 A | 6/1999 | Suzuki | |
| 5,943,993 A | 8/1999 | Carstensen | |
| 6,092,501 A | 7/2000 | Matayoshi et al. | |
| 6,173,690 B1 | 1/2001 | Iriya et al. | |
| 6,334,427 B1 * | 1/2002 | Nakayama et al. | 123/305 |
| 6,418,905 B1 * | 7/2002 | Baudlot et al. | 123/301 |

FOREIGN PATENT DOCUMENTS

| | | |
|---|---|---|
| DE | 199 18 036 | 10/1999 |
| EP | 1 191 199 | 3/2002 |
| JP | 2000-87750 | 3/2000 |
| JP | 2002-115549 | 4/2002 |
| WO | WO 99/53179 | 10/1999 |

* cited by examiner

Primary Examiner—Tony M. Agenbright
(74) Attorney, Agent, or Firm—Foley & Lardner

(57) ABSTRACT

A direct fuel injection engine includes a fuel injector so positioned and oriented as to produce a fuel spray whose upper segment reaches the vicinity of a spark plug by a penetrating force of the fuel spray in a low engine speed light load operating region to achieve stratified charge combustion without the aid of tumble. A tumble control valve is operated to strengthen the tumble in a combustion chamber to achieve stratified charge combustion with the aid of tumble in an engine operating region higher in engine speed and/or engine load.

11 Claims, 4 Drawing Sheets

INCYLINDER DIRECT INJECTION SPARK IGNITION ENGINE

BACKGROUND OF THE INVENTION

The present invention relates to an incylinder direct injection spark ignition engine.

An incylinder direct injection spark ignition engine is generally arranged to perform stratified charge combustion in a preset engine operating region, by utilizing incylinder fluid flow in a combustion chamber to covey injected fuel to the vicinity of a spark plug for ignition. Published Japanese Patent Application, Publication (Kokai) No. 2000-87750 discloses such a direct injection engine.

SUMMARY OF THE INVENTION

In a low engine speed light engine load region, the quantity of intake air is so small that tumble in a combustion chamber is too weak to carry injected fuel adequately to the vicinity of a spark plug, and to achieve stratified charge combustion satisfactorily.

It is therefore an object of the present invention to provide a direct injection spark ignition engine capable of providing stable stratified charge combustion even in the low speed light load engine operating region.

According to the present invention, an incylinder direct injection spark ignition engine comprises: a cylinder block comprising a cylinder bore; a cylinder head comprising a depression defining an upper inside surface of a combustion chamber; a spark plug projecting from the upper surface of the combustion chamber; a piston which is received in the cylinder bore to reciprocate in the cylinder bore, which comprises a piston crown which forms the combustion chamber with the depression of the cylinder head, and which is formed with a cavity; first and second intake ports opened in the upper surface of the combustion chamber, and designed to introduce intake air toward the piston so as to create tumble in cooperation with the cavity; an incylinder fluid motion control device which is to be operated in a first engine operating region, to promote the tumble in the combustion chamber so that injected fuel is conveyed to the spark plug by the tumble; and a fuel injector which is positioned, between the first and second intake ports, at a position lower than the first and second ports, which is arranged to inject fuel directly into the combustion chamber toward the center of the combustion chamber on compression stroke, and to produce a fuel spray penetrating the vicinity of the spark plug in a second engine operating region which is a low speed light load region.

According to another aspect of the present invention, an incylinder direct injection spark ignition engine comprises: an engine block (such as an assembly of cylinder block and head) comprising a cylinder bore, and a depression defining an upper inside surface of a combustion chamber; a spark plug located in a center region of the upper inside surface into the combustion chamber; a piston comprising a cylindrical portion to reciprocate in the cylinder bore and a piston crown formed with a cavity; at least one intake port which is opened in an intermediate region of the upper inside surface of the combustion chamber located radially between the central region and a peripheral region of the upper inside surface of the combustion chamber, and which is designed to introduce intake air toward the piston so as to create tumble in cooperation with the cavity; a tumble control valve provided in said one intake port, and arranged to move between an operative state to promote the tumble in the combustion chamber to convey injected fuel to the spark plug by the tumble to achieve a first stratified charge combustion mode, and an inoperative state to restrain the tumble in the combustion chamber to achieve a second stratified charge combustion mode in a low engine speed light engine load operating region; and a fuel injector located in the peripheral region of the upper inside surface of the combustion chamber, and configured to produce a fuel spray spreading in the form of a cone bounded between a lowermost line directed to the cavity of the piston crown and an uppermost line aimed at the spark plug in the second stratified charge combustion mode.

According to still another aspect of the present invention, an incylinder direct injection spark ignition engine comprises: igniting means for igniting an ignitable air fuel mixture cloud when the air fuel mixture cloud reaches a spark region in a combustion chamber of the engine; tumble producing means for producing tumble in the combustion chamber by introducing intake air into the combustion chamber in a first stratified charge combustion mode, and restraining the tumble in a second stratified charge combustion mode; and injecting means for injecting fuel into the combustion chamber in a direction to avoid interference with the spark region, and thereby producing a fuel spray comprising an upper segment which reaches the spark region in the second stratified charge combustion mode.

The other objects and features of this invention will become understood from the following description with reference to the accompanying drawings.

BRIEF DESCRIPTION OF THE DRAWINGS

FIG. 1A is a sectional view, and FIG. 1B is a view as viewed from a piston's side to a cylinder head.

FIG. 2A is a plan view, and FIG. 2B is a vertical sectional view.

DETAILED DESCRIPTION OF THE INVENTION

Figure 1A:
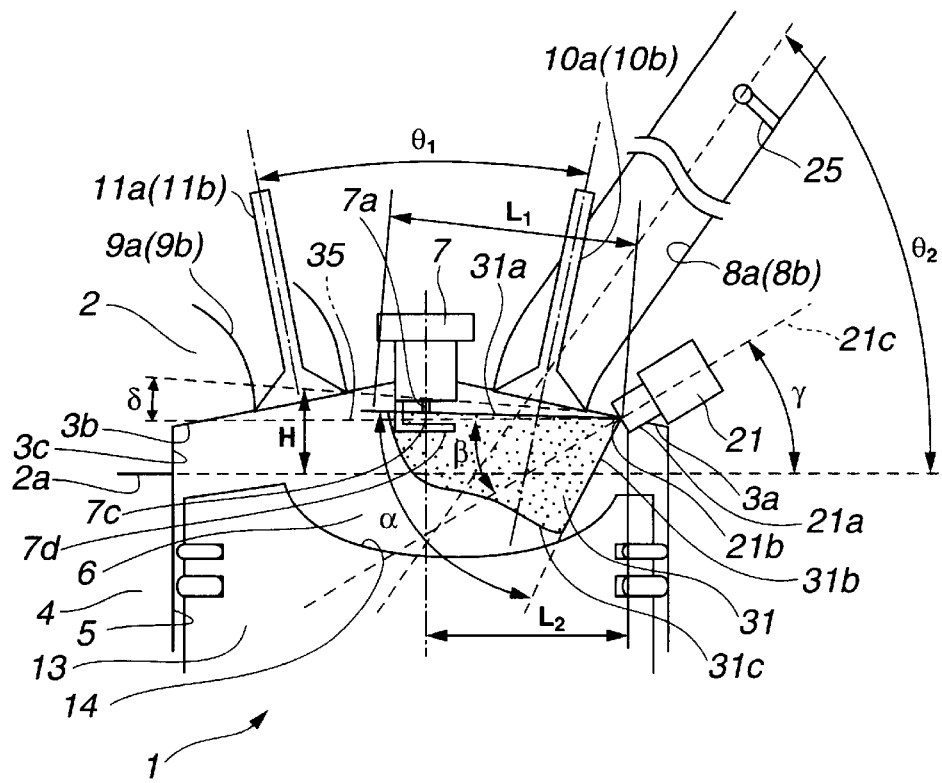
FIGS. 1A and 1B show schematically an incylinder direct fuel injection spark ignition engine according to one embodiment of the present invention.
Figure 1B:
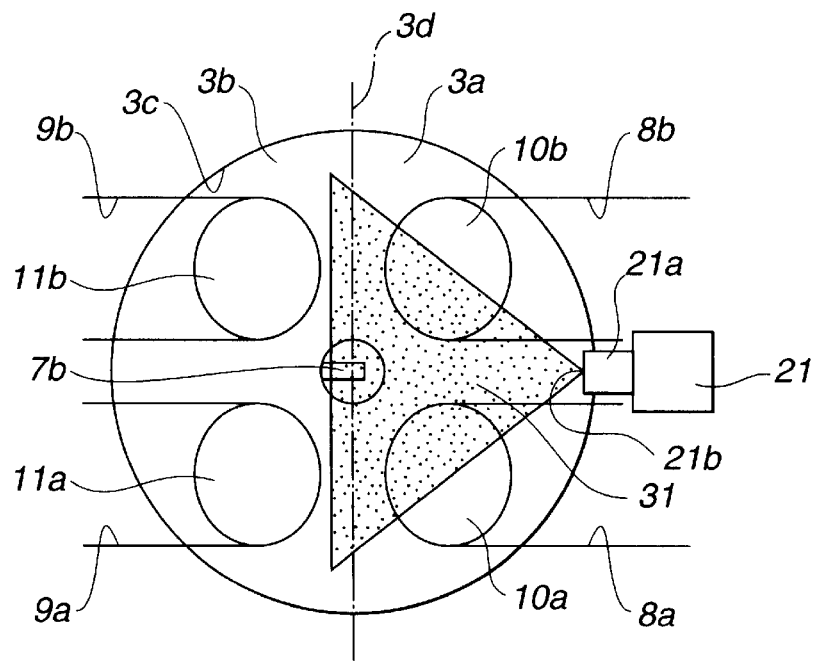

FIGS. 1A and 1B show an incylinder direct fuel injection spark ignition engine 1 according to one embodiment of the present invention. Though engine 1 of this example is a multi-cylinder engine, FIGS. 1A and 1B show only one of cylinders to facilitate the explanation. Engine 1 of this example is fundamentally an air guide type direct injection engine including at least one intake port and a piston cavity which are configured to produce tumble incylinder air flow to carry fuel sprayed into the combustion chamber, to the vicinity of a spark plug located on the ceiling of the combustion chamber. As shown in FIG. 1A, a piston 13 slides up and down. Though the engine may be installed horizontally or obliquely in a vehicle, for example, the direction of piston movement to compress gases in the combustion chamber is referred to as an upward direction.

A cylinder head 2 is formed with a depression confronting a cylinder bore 5 formed in a cylinder block 4. The depression is recessed from a lower face 2a of cylinder head 2, and bounded by first and second sloping surfaces 3a and 3b sloping down from a ridge 3d in two opposite directions, and a cylindrical surface 3c. First and second sloping inside surfaces 3a and 3b form a ceiling or upper inside surface of the combustion chamber. First and second sloping inside surfaces 3a and 3b are substantially symmetric in the manner of bilateral symmetry. Cylindrical inside surface 3c of combustion chamber extends downward from lower ends of first and second sloping surfaces 3a and 3b.

A pentroof combustion chamber 6 is formed by sloping inside surfaces 3a and 3b, cylindrical inside surface 3c, cylinder bore 5, and piston 13 slidable in cylinder bore 5 through piston rings. The geometric configuration of combustion chamber 6 is determined by a bore diameter (inside diameter) of cylinder bore 5, the shape of the piston crown of piston 13, a roof height H of cylinder head 2 (i.e., the height from lower face 2a of cylinder head 2 to a ridge 3d of upper inside surface of the combustion chamber 6), and an inter-valve angle θ1 formed between the stems (or center axes) of intake and exhaust valves. About the middle of the ridge 3d along which the first and second sloping surfaces 3a and 3b meet, there is provided a spark plug 7 including a projecting portion projecting into combustion chamber 6 and having a center electrode 7a and an outside electrode 7b. Spark plug 7b is located substantially at the center of the ceiling of combustion chamber 6 in this example as shown in FIG. 1B.

Two intake ports 8a and 8b open downward in first sloping inside surface 3a on the right side as viewed in FIGS. 1A and 1B, and two exhaust parts 9a and 9b open downward in second sloping surface 3b on the left side. Intake ports 8a and 8b are designed to produce tumble (vertical swirl as viewed in FIG. 1A) in combustion chamber 6 by introducing intake air in a direction toward the piston crown (that is, a direction to avoid interference with spark plug 7) and causing the intake air stream to impinge on the piston crown. To create tumble, intake ports 8a and 8b stand upright as compared with the intake port design in an engine for a premixed combustion. Namely, an inflowing angle θ2 is greater, as shown in FIG. 1A. In this example, the inflowing angle θ2 is defined as an angle between the flat lower face (or underside) 2a of cylinder head 2 and a straight center line of each of intake ports 8a and 8b. Piston 13 is formed, in the crown, with a shallow cavity 14 designed to promote the tumble motion.

Figure 2A:
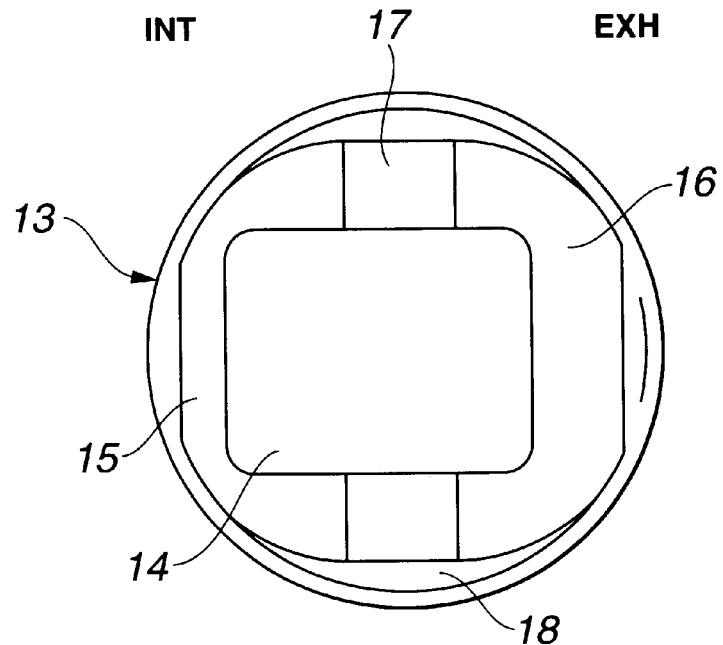
FIGS. 2A and 2B show the piston used in the engine shown in FIGS. 1A and 1B.
Figure 2B:
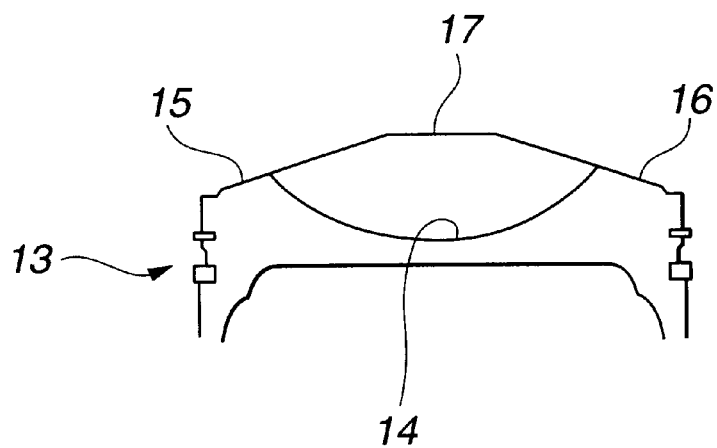

FIGS. 2A and 2B illustrate the shape of piston 13. The piston crown includes a raised rim (outer portion) surrounding cavity 14. The raised rim includes an intake side slope 15, an exhaust side slope 16, a center ridge section 17 extending between the two slopes 15 and 16, and a conical outside surface 18 surrounding slopes 15 and 16 and center ridge section 17. Center ridge section has a flat horizontal upper surface which is divided into two equal halves by cavity 14. In FIGS. 2A and 2B, the left and right sides of piston 13 are reversed so that intake side slope 15 is on the left side in FIGS. 2A and 2B whereas the intake side is on the right side in FIGS. 1A and 1B. (Japanese Patent Application No. 2000-306511 discloses the design of a piston of similar type.)

A high pressure fuel injector 21 is provided in intake side sloping inside surface 3a of cylinder head 2, and arranged to inject fuel directly into combustion chamber 6. Fuel injector 21 is positioned circumferentially between the openings of intake ports 8a and 8b, at a radially outer position which is lower in height than the position of the openings of intake ports 8a and 8b, and which is near to cylindrical surface 3c, or the lower end of sloping surface 3a. Fuel injector 21 is thus positioned and oriented to inject fuel so that the fuel can be carried by the tumble. Fuel injector 21 includes a nozzle 21a for injecting fuel, through an injection hole 21b formed at the tip of nozzle 21a, in an oblique downward direction toward a position just below a spark point 7c of spark plug 7. Intake valves 10a and 10b are provided to open and close the openings of first and second intake ports 8a and 8b, respectively. Exhaust valves 11a and 11b are provided to open and close the openings of first and second exhaust ports 9a and 9b, respectively.

Figure 3A:
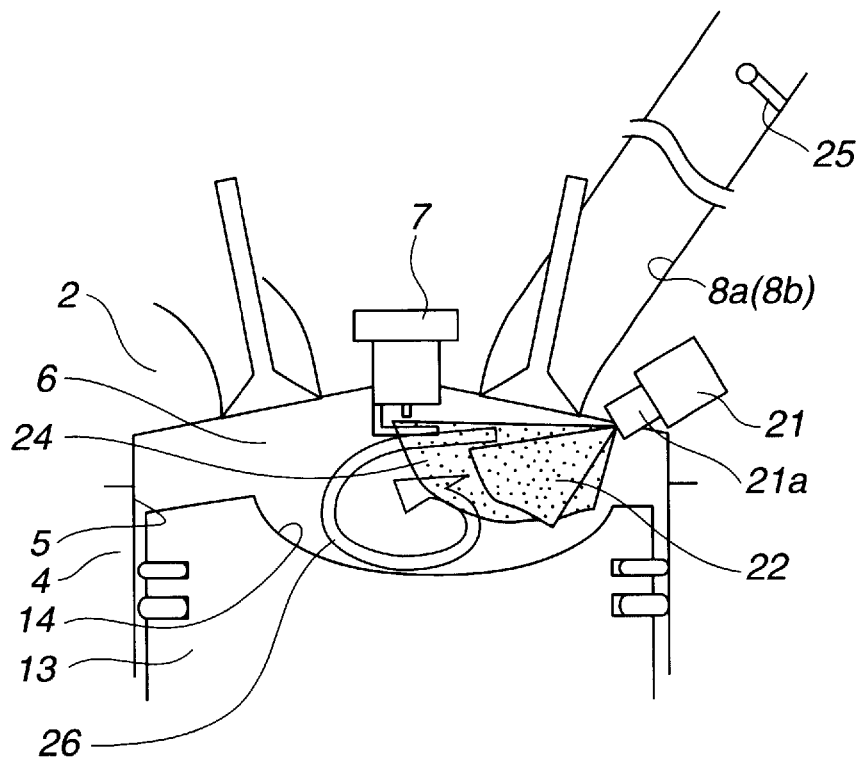
FIGS. 3A and 3B are sectional views showing two different stratified charge combustion modes performed by the engine shown in FIGS. 1A and 1B.

A tumble control valve 25 is provided in each of intake ports 8a and 8b, at a position upstream of the opening to combustion chamber 6. Tumble control valves 25 serve as an incylinder fluid motion control device for promoting tumble 26 in combustion chamber 6. When each tumble control valve 25 is closed, a lower half of the fluid passage section of the intake port 8a or 8b is closed, and the intake air flow is admitted only through the upper half. In this closed state, therefore, the tumble control valves 25 strengthen the tumble 26 in combustion chamber 6 by increasing the flow velocity of intake air flow, as shown in FIG. 3A. This tumble 26 gathers and carries a fuel spray injected from fuel injector 21, toward spark plug 7, thereby forms a rich ignitable mixture cloud 24. When the mixture cloud reaches the spark point 7c, spark plug 7 can ignite the mixture cloud 24 to achieve stable stratified charge combustion performance. The spark point 7c is formed basically between center electrode 7a and outside electrode 7b of spark plug 7.

Tumble control valves 25 are closed in a medium engine speed, medium engine load operating region in a stratified charge combustion region. The stratified charge combustion region has a breadth of some extent, and hence the optimum fuel injection timing and the optimum ignition timing vary in dependence on changes in engine speed and/or engine load within the stratified charge combustion region. Therefore, the tumble is required to carry the mixture cloud to the region around spark point 7c at a best timing over the entirety of the stratified charge combustion region. Therefore, the inflowing angle θ2 of intake ports 8a and 8b, inter-valve angle θ1 between axes of intake and exhaust valves as shown in FIG. 1, and piston crown shape of piston 13 are configured to achieve a strong tumble in combination.

In a region outside the stratified charge combustion region, engine 1 is operated to achieve homogeneous charge combustion aimed mainly at the theoretical air fuel ratio. In this homogeneous charge combustion region where the engine speed and/or engine load is higher than the limits of the stratified charge combustion region, a sufficient amount of intake air flow can produce strong tumble in combustion chamber 6 even if tumble control valves 25 are open. In this embodiment, therefore, tumble control valves 25 are held open in the homogeneous charge combustion mode, and fuel injector 21 is driven to inject fuel on induction stroke in the state of tumble to obtain homogeneous mixture in the entirety of combustion chamber 6 for homogeneous charge combustion.

A low engine speed, light engine load operating region inclusive of an idling operation is a subregion of the stratified charge combustion region. In this low speed light load region, the intake air flow is too weak to expect sufficient tumble. Therefore, in this region, fuel is sprayed from fuel injector 21 so as to reach the region around spark point 7c of spark plug 7 only by the force of fuel spray. The following are two basic requirements to achieve this.

First, a fuel spray diverges from injection hole 21b of fuel injector 21 in the form of a cone having a conical surface containing a segment (uppermost line 31a) which is closest to spark point 7c of spark plug 21, and which passes through spark point 7c.

Second, a penetration L1 of the fuel spray of fuel injector 21 is longer than a distance L2 from the injection hole point 21b at the tip of fuel injection nozzle 21a to the spark point 7c of spark plug 7. The penetration L1 is an outreach or a distance which the fuel spray can travel.

The fuel spray is generally conical and symmetric around a center axis 21c of injection nozzle 21a of fuel injector 21 as shown in FIG. 1B. If the conical fuel spray is entirely symmetric, and has a lowermost line equal in length to the uppermost line, then the lower end portion of the fuel spray impinges on the surface of piston cavity 14 and wets the cavity surface, and the fuel wetting can increase HC emissions in the low speed light load region. Moreover, if the penetration L1 of the fuel spray is so long as to allow the injected fuel to reach the exhaust side sloping inside surface 3b, then the quantity of HC emission is increased, as confirmed by experiment. Accordingly, the following two supplementary requirements are to be met to restrain the HC emission increase due to impingement of fuel against the piston crown and exhaust side sloping inside surface 3b.

Third, the fuel spray extends longer in the direction toward spark plug 7 than in the direction toward piston 13.

Fourth, the penetration L1 of the fuel spray is not so long as to reach the exhaust side upper inside sloping surface 3b.

The fuel spray shown in the section of FIG. 1A has a shape fulfilling all of the two basic requirements and the two supplementary requirements. An uppermost edge (or uppermost straight line segment) of the conical fuel spray 31 passes through the spark point 7c but terminates before reaching the position of the openings of exhaust ports 9a and 9b. On the other hand, a lowermost edge (or lowermost straight line segment) 31b of the conical fuel spray 31 is shorter than the upper most edge 31a, and does not reach the surface in the piston cavity 14. A forward end 31c of the fuel spray 31 extending between uppermost line 31a and lowermost line 31b reaches neither the piston cavity 14 nor exhaust side sloping surface 8b.

In this embodiment, the following geometric factors are determined so as to meet all of the aforementioned four requirements. That is, the relative positional relationship between the fuel injection hole point 21b and spark point 7c, fuel spray angle α, a diverging angle β of fuel spray, and mounting angle γ of fuel injector 21 are determined so as to fulfill all the four requirements. In the sectional view of FIG. 1A, fuel spray angle α is an angle formed between uppermost edge 31a and lowermost edge 31b of fuel spray 31 spreading from injection hole point 21a. Diverging angle β is an angle between center line 21c of the fuel injector nozzle 21a and uppermost edge 31a of fuely spray 31. Mounting angle γ is an angle between center line 21c of fuel injector nozzle 21a and cross sectional plane (or cylinder head lower surface 1a) to which the axis of cylinder bore 5 is perpendicular.

In practice, the mounting position of spark plug 7, the mounting position and mounting angle of fuel injector 21, roof height H, and bore diameter of cylinder bore 5 involve unit-to-unit variation due to manufacturing process. Experiments showed the following conclusion about a deviation angle δ defined as an angle formed by the uppermost edge 31a of conical fuel spray 31 with respect to a straight line 35 connecting the fuel injection hole point 21b and spark point 7c. When deviation angle δ is in the range of ±5 deg, it is possible to cause fuel injected under a back pressure, to reach the vicinity of spark point 7c of spark plug 7 only by the impetus of fuel spray, and to obtain stable and optimum stratified charge combustion. The back pressure is an incylinder pressure at the later stage of compression stroke.

In the case of a fuel spray intended to reach the vicinity of the spark point only by the force of fuel spray in the low speed light load region including the idle operation region, the tumble can disturb the fuel spray and incur misfire. Accordingly, tumble control valves 25 are held in the fully open state to minimize the magnitude of incylinder tumble flow in the low speed light load operating region inclusive of idling operating region. Though complete elimination of tumble may be an ideal goal, weak tumble 36 does not exert undesired influence on stratified charge combustion in this engine operating region, according to the results of experiments.

Figure 4:
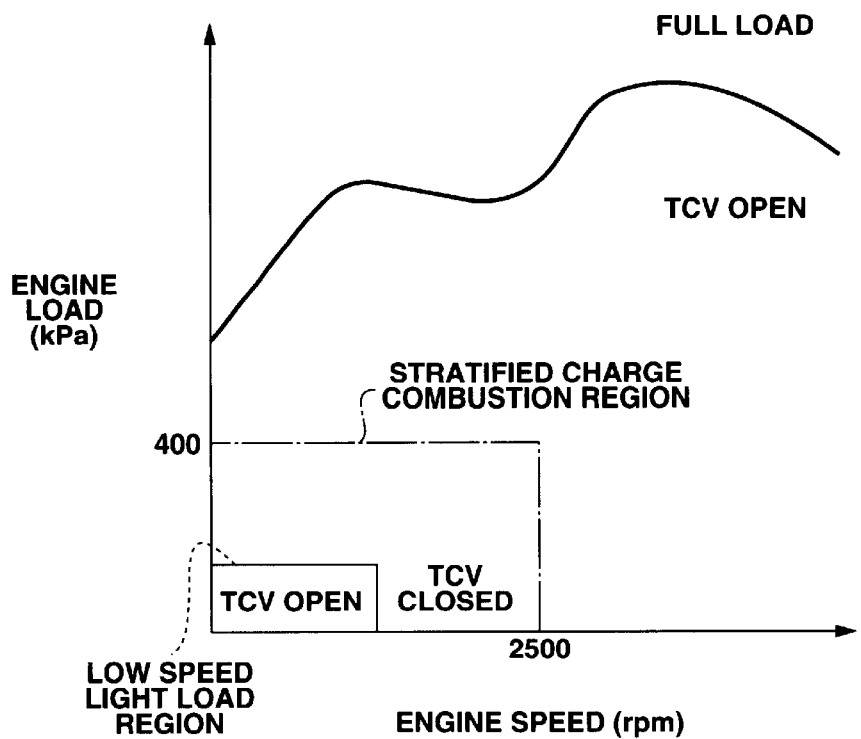
FIG. 4 is a graph showing two different engine operating regions for stratified charge combustion, and one region for homogeneous combustion performed by the engine of FIGS. 1A and 1B.
Figure 5:
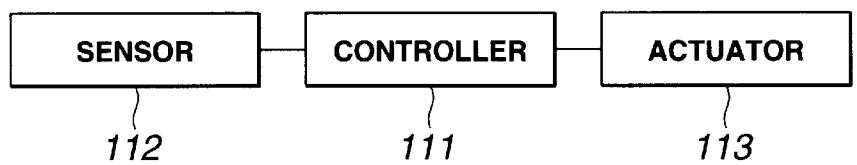
FIG. 5 is a block diagram showing an engine controller for the engine of FIGS. 1A and 1B.

FIG. 4 shows a control map employed in an engine controller 111 for controlling tumble control valves 25. In FIG. 4, tumble control valve is abbreviated to TCV. The control region is divided into a stratified charge combustion region in which stratified charge combustion is performed, and a homogeneous charge combustion region in which homogeneous charge combustion is performed. The homogeneous combustion region is an engine operating region in which the engine speed is higher than a limit of the stratified charge combustion region and/or the engine load is heavier than a limit of the stratified charge combustion region. In this example, the stratified charge combustion region is bounded by an engine speed limit of 2500 rpm and an engine load limit of 400 kPa as shown by one dot chain lines in FIG. 4. Homogeneous charge combustion is performed when the engine speed is higher than the medium speed level of 2500 rpm or when the engine load is heavier than the medium load level of 400 kPA. Moreover, the stratified charge combustion region is subdivided into a low engine speed light load operating region (or subregion) and a remaining region (or subregion) in which the engine speed is higher than an engine speed limit of the low speed light load region and/or the engine load is heavier than an engine load limit of the low speed light load region.

In accordance with engine operating conditions collected by a sensor section 112, engine controller 111 controls the operation of engine with an actuator section 13 inclusive of tumble control valves 25. Controller 111 selects one from the three engine operating regions by monitoring the current engine speed and load sensed by sensor section 112, and controls tumble control valves 15 in dependence on the selected operating region. If the current engine operating point determined by the current engine speed and load is located within the homogeneous charge combustion region, engine controller 111 holds tumble control valves 25 in the open state. When the engine operating point enters the stratified charge combustion region, then engine controller 111 closes tumble control valves 25 to increase the tumble in the combustion chamber. When the engine speed and/or engine load further decrease into the low speed light load region, then engine controller 111 opens tumble control valves 25.

Engine controller 111 of this example calculates desired fuel injection quantity and desired fuel injection timing adapted to stratified charge combustion or homogeneous charge combustion and controls the actual fuel injection quantity and fuel injection timing in accordance with the results of the calculation. Moreover, engine controller 111 calculates a desired ignition timing adapted to stratified charge combustion or homogeneous charge combustion, and controls the actual ignition timing in accordance with the result of the calculation. Engine controller 111 includes as a main component, at least one processor.

Figure 3B:
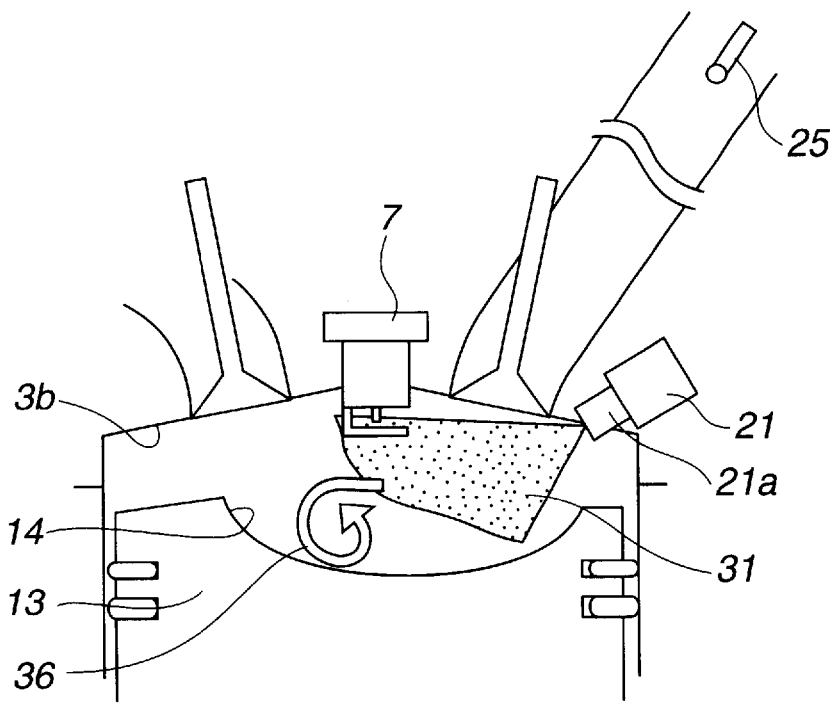

FIG. 3B illustrates the operation of engine 1 in the low speed light load region (at idling, for example). Fuel injected under the back pressure can reach spark point 7c of spark plug 7 only by the force of a fuel spray. Therefore, engine 1 can perform stable stratified charge combustion to provide optimum performance in the low speed light load region in which sufficient tumble is unobtainable.

The fuel spray is made weaker in the direction toward piston 13 than in the direction toward spark plug 7 to prevent fuel from impinging on the surface of piston crown. Moreover, the penetration of the fuel spray is so determined that the fuel spray does not reach the exhaust side sloping inside surface 3b. This design prevents fuel from adhering to piston crown and exhaust side sloping inside surface 3b, and thereby restrains an undesired increase of HC emissions.

In this low speed light load region, tumble control valves 25 are put in the fully open state to minimize the tumble. Thus, the fuel spray is protected from being disturbed by the tumble, and the possibility of misfire is reduced.

When the engine load increases from this state and the back pressure becomes higher, the fuel spray tends to become smaller in size, and the time interval from the fuel injection to the ignition becomes shorter as the speed increases. Therefore, injected fuel could not reach spark plug 7 in time for the optimum ignition timing if the conveyance of fuel to spark plug 7 is carried out only by the penetrating force of a fuel spray in this engine operating region. In this operating region, therefore, controller 111 closes tumble control valves 25 as shown in FIG. 3A, to produce strong tumble 26 in combustion chamber 6. In the region outside the low speed light load region within the stratified charge combustion region, fuel is injected in a direction to interfere with this strong tumble 26, and carried by the strong tumble 26 to the vicinity of spark plug 7. Thus, stratified charge combustion is performed with the aid of tumble.

In this way, the direct injection engine according to this embodiment of the present invention can perform the stratified charge combustion adequately in both of the low speed light load region and the remaining region (or medium speed medium load region) by utilizing a first mode adapted to the medium speed medium load region and a second mode adapted to the low speed light load region, so that the fuel economy can be improved over the entirety of a broad stratified charge combustion region.

In determining the shape of a fuel spray in the low speed light load region, the tumble is no longer a factor to be considered, and the remaining main factor is the relative positional relationship between fuel injector 21 and spark plug 7 about the basic requirements. In the stratified charge combustion region outside the low speed light load region, optimum performance is achieved by the control of tumble, so that the requirement imposed on the shape of a fuel spray is simplified. Therefore, the present invention is readily applicable to combustion chambers of difference dimensions to the advantage of manufacturing cost due to good flexibility and productivity.

In the illustrated embodiment, spark plug 7 serves as igniting means for igniting an ignitable air fuel mixture cloud, and fuel injector 21 serve as injecting means for injecting fuel into the combustion chamber. Intake ports 8a and 8b, piston cavity 14 and tumble control vales 25 can serve as tumble producing means for producing tumble in the combustion chamber by introducing intake air into the combustion chamber in a first stratified charge combustion mode, and restraining the tumble in a second stratified charge combustion mode.

This application is based on a prior Japanese Patent Application No. 2000-00367. The entire contents of Japanese Patent Application No. 2000-00367 with a filing date of Jan. 5, 2001 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An incylinder direct injection spark ignition engine comprising:
   a cylinder block defining a cylinder bore;
   a cylinder head comprising a depression defining an upper inside surface of a combustion chamber;
   a spark plug projecting from the upper surface of the combustion chamber;
   a piston received in the cylinder bore to reciprocate in the cylinder bore, the piston comprising a piston crown which forms the combustion chamber with the depression of the cylinder head, and which is formed with a cavity;
   first and second intake ports opened in the upper surface of the combustion chamber, and designed to introduce intake air toward the piston so as to create tumble in cooperation of the cavity;
   an incylinder fluid motion control device which is to be operated in a first engine operating region, to promote the tumble in the combustion chamber so that injected fuel is conveyed to the spark plug by the tumble; and
   a fuel injector positioned, between the first and second intake ports, at a position lower than the first and second ports, and arranged to inject fuel directly into the combustion chamber toward the center of the combustion chamber on compression stroke, the fuel injector being configured to produce a fuel spray penetrating a vicinity of the spark plug in a second engine operating region which is a low speed light load region.

2. The incylinder direct injection spark ignition engine as claimed in claim 1, wherein the upper surface of the combustion chamber comprises first and second sloping regions shaped to form a pentroof combustion chamber; the spark plug is located between the first and second sloping regions; the first and second intake ports are opened in an intermediate portion of the first sloping region; the intermediate portion of the first sloping region in which the first and second intake ports are opened is located between the spark plug and the fuel injector; and the fuel injector is configured to produce the fuel spray having a conical surface passing through the vicinity of the spark plug.

3. The incylinder direct injection spark ignition engine as claimed in claim 2, wherein the first engine operating region is a region which is higher in at least one of engine speed and engine load than the second engine operating region; the first and second intake ports and the cavity of the piston crown are configured to produce the tumble to convey injected fuel to the vicinity of the spark plug in the first engine operating region; and the fuel injector is configured to convey injected fuel directly to the vicinity of the spark plug by a penetrating force of the fuel spray in the second engine operating region, without the aid of tumble.

4. The incylinder direct injection spark ignition engine as claimed in claim 3, wherein the spark plug is located in a center region of the upper surface of the combustion chamber, the fuel injector is located in the first sloping region near a lower end of the first sloping region; the fuel injector is configured to produce the fuel spray having the conical surface passing through a spark point of the spark plug in the second engine operating region; and the distance of penetration of the fuel spray injected by the fuel injector in the second engine operating region is longer than the distance between the spark point of the spark plug and an fuel injection hole of the fuel injector.

5. The incylinder direct injection spark ignition engine as claimed in claim 3, wherein the spark plug is located in a center region of the upper surface of the combustion chamber, the fuel injector is located in the first sloping region near a lower end of the first sloping region, and the fuel injector is configured to produce the fuel spray having the conical surface whose uppermost line forms an angle in the range of ±5°, with a line connecting a fuel injection point of the fuel injector and a spark point of the spark plug in the second engine operating region, the upper most line being a line of the conical surface closest to the spark point.

6. The incylinder direct injection spark ignition engine as claimed in claim 2, wherein the fuel injector is configured to produce the fuel spray having a penetrating force which is weaker in a direction toward the piston than in a direction toward the spark plug, so that the fuel spray does not reach the piston crown.

7. The incylinder direct injection spark ignition engine as claimed in claim 2, wherein the fuel injector is configured to produce the fuel spray having a penetration which does not reach the second sloping region of the upper inside surface of the combustion chamber.

8. The incylinder direct injection spark ignition engine as claimed in claim 1, wherein the tumble is made weakest in the second engine operating region.

9. The incylinder direct injection spark ignition engine as claimed in claim 1, wherein the engine further comprise a controller to control the fuel injector to achieve a homogeneous charge combustion in a third engine operating region, and to achieve a stratified charge combustion mode in the first and second engine operating regions, and to put the incylinder fluid motion control device in an operative state to increase magnitude of the tumble in the combustion chamber in the first engine operating region whereas the incylinder fluid motion control device is held in an inoperative state in the third engine operating region for the homogeneous charge combustion mode, the controller being configured to put the incylinder fluid motion control device in the inoperative state to reduce the magnitude of the tumble in the second engine operating state.

10. An incylinder direct injection spark ignition engine comprising:
an engine block comprising a cylinder bore, and a depression defining an upper inside surface of a combustion chamber;
a spark plug located in a center region of the upper inside surface of the combustion chamber;
a piston comprising a cylindrical portion to reciprocate in the cylinder bore and a piston crown formed with a cavity;
at least one intake port opened in an intermediate region of the upper inside surface of the combustion chamber, and designed to introduce intake air toward the piston so as to create tumble in cooperation with the cavity, the intermediate region being located radially between the central region and a peripheral region of the upper inside surface of the combustion chamber;
a tumble control valve provided in said one intake port, and arranged to move between an operative state to promote the tumble in the combustion chamber to convey injected fuel to the spark plug by the tumble to achieve a first stratified charge combustion mode, and an inoperative state to restrain the tumble in the combustion chamber to achieve a second stratified charge combustion mode in a low engine speed light engine load operating region; and
a fuel injector located in the peripheral region of the upper inside surface of the combustion chamber, and configured to produce a fuel spray spreading in the form of a cone bounded between a lowermost line directed to the cavity of the piston crown and an uppermost line aimed at the spark plug in the second stratified charge combustion mode.

11. An incylinder direct injection spark ignition engine comprising:
igniting means for igniting an ignitable air fuel mixture cloud when the air fuel mixture cloud reaches a spark region in a combustion chamber of the engine;
tumble producing means for producing tumble in the combustion chamber by introducing intake air into the combustion chamber in a first stratified charge combustion mode, and restraining the tumble in a second stratified charge combustion mode; and
injecting means for injecting fuel into the combustion chamber in a direction to avoid interference with the spark region, and thereby producing a fuel spray comprising an upper segment which reaches the spark region in the second stratified charge combustion mode.

* * * * *